Patented May 16, 1933

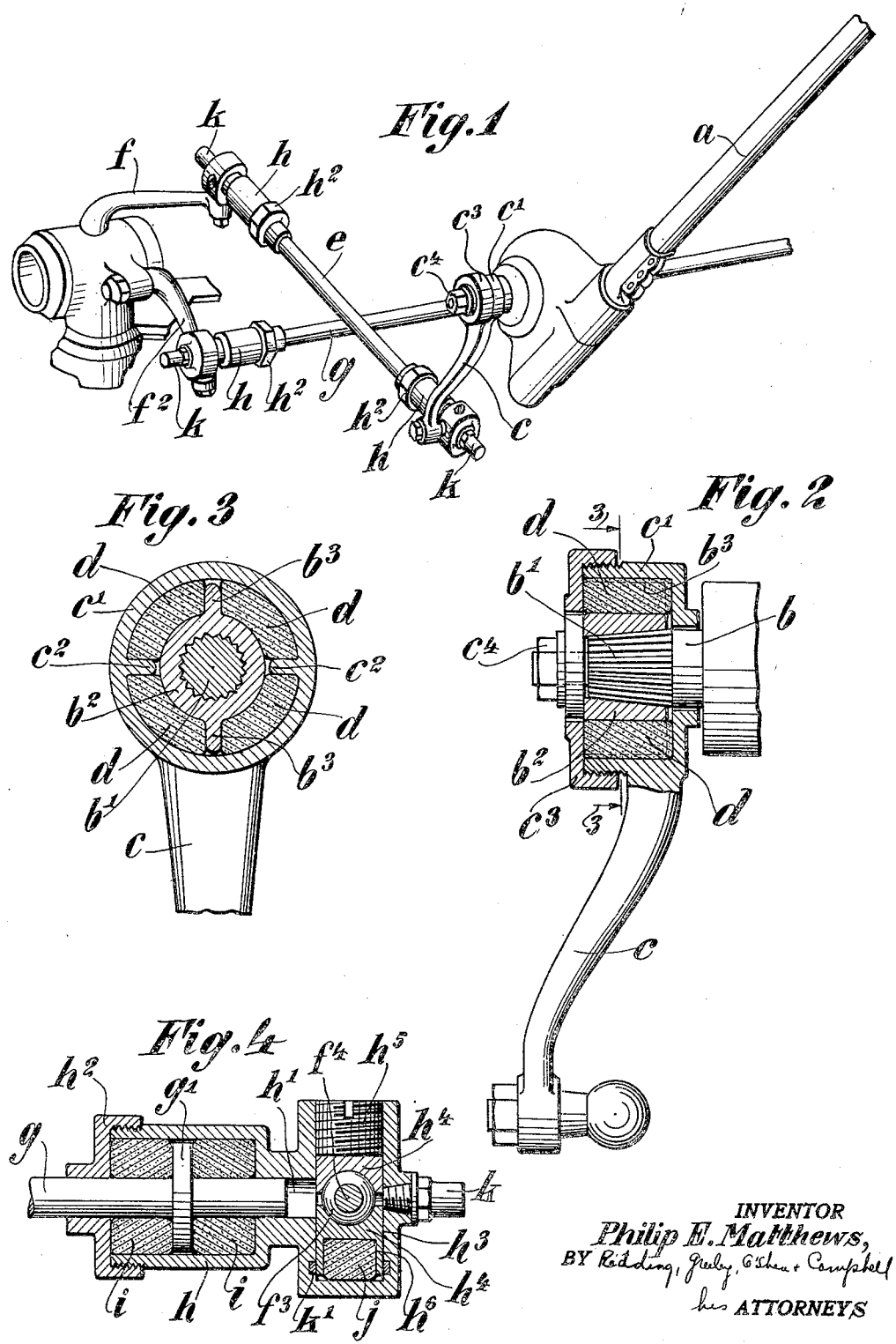

1,908,776

UNITED STATES PATENT OFFICE

PHILIP E. MATTHEWS, OF PLAINFIELD, NEW JERSEY, ASSIGNOR TO INTERNATIONAL MOTOR COMPANY, OF NEW YORK, N. Y., A CORPORATION OF DELAWARE

STEERING MECHANISM

Application filed November 1, 1929. Serial No. 403,933.

The present invention relates to steering mechanisms and embodies, more specifically, an improved steering mechanism in which the vibrations and shocks impressed thereon during movement of the vehicle are effectively cushioned and substantially eliminated before reaching the hands of the operator of the vehicle.

In recent years, attempts have been made to cushion the vibrations set up in the steering mechanism and prevent their transmission to the steering column and wheel manipulated by the driver of the vehicle. Further attempts have been made to eliminate the objectionable "shimmying" of the steering wheels and it has been found that such "shimmying" may be eliminated by relieving the steering wheels of a rigid mounting between the wheels and permitting a degree of yielding of such mountings with respect to each other. The present invention seeks to provide a device for eliminating the objectionable vibrations set up in the steering mechanism and transmitted to the steering column and wheel, at the same time preventing the above mentioned "shimmying" of the steering wheels. In carrying out the above objectives, a universally yielding steering mechanism is provided, not only serving to cushion the vibrations impressed upon the drag link thereof, but also the vibrations in the tie rod connecting the wheels for steering.

An object of the above invention, accordingly, is to afford a steering mechanism in which the vibrations set up in the mechanism are cushioned and materially reduced before being transmitted to the hands of the driver of the vehicle.

A further object of the invention is to provide a steering mechanism in which the wheels are so connected that "shimmying" thereof is effectively eliminated.

Further objects, not specifically enumerated above, will be apparent as the invention is described in greater detail in connection with the accompanying drawing, wherein:

Figure 1 is a perspective view showing a steering mechanism constructed in accordance with the present invention.

Figure 2 is a view in section, taken on a plane passing through the axis of the stub shaft mounting the worm wheel of the steering mechanism.

Figure 3 is a view in section, taken on line 3—3 of Figure 2, and looking in the direction of the arrows.

Figure 4 is a view in section taken on a plane passing through the axis of the tie rod shown in Figure 1.

Referring to the above drawing, $a$ designates a steering column having a worm and worm wheel, not shown. The worm wheel or gear is mounted upon a shaft $b$, the end of which is serrated at $b'$. On this serrated portion of shaft $b$, a driving dog $b^2$ is secured. Diametrically extending bearing members $b^3$ are formed on the driving dog and serve to transmit the steering forces as described hereinafter.

A steering lever $c$ is provided with a housing $c'$ having inwardly extending diametrically opposed flanges $c^2$. Between the flanges $c^2$ and $b^3$, yielding non-metallic blocks $d$ are mounted. A threaded cover $c^3$ is secured over the housing $c'$ and a nut $c^4$ is provided to lock the parts in assembled position. It will be apparent that movement between the driving dog $b^2$ and steering lever $c$ is transmitted through the blocks of yielding non-metallic material $d$, such as rubber.

A drag link $e$ is secured between the steering lever $c$ and steering arm $f$ of one of the steering wheels. This front wheel is also formed with a second arm $f^2$ to which a drag link, or cross steering tube $g$ is connected in the manner described hereinafter.

At either end of the drag link $e$ and the tie rod $g$, a cushion connection is provided for eliminating any "shimmying" of the wheels and cushion the shocks imposed thereon during movement of the vehicle. A housing $h$ is formed with an axial cylindrical bearing surface $h'$ in which an end of the drag link or tie rod is slidably received. A threaded cover $h^2$ is secured to the housing and serves as an additional bearing for the above elements. The ends of the drag link and tie rod are formed with flanged collars, as shown in Figure 4. The construction of Figure 4, representing the connection at the ends of the tie rod, is similar in every detail to the connection at the ends of the drag link $e$ and a description of the connection for one of such locations will suffice. The flanged collar of the drag link $g$ is indicated at $g'$ and is received within the housing $h$. Spaced annular blocks $i$ of yielding non-metallic material are carried upon either side of the flange $g'$ within housing $h$ and serve to resist, yieldingly, axial movements of the shaft $g$.

The housing $h$ is formed with a recess $h^3$ within which spaced blocks $h^4$ are secured. These blocks are formed with spherical bearing surfaces to receive the ball $f^3$ carried upon the arm $f^4$. Where the connection is used between the drag link and steering lever $c$, or between the drag link and arm $f$, the ball $f^3$ will be the corresponding element in such connections. A nut $h^5$ secures the bearing blocks in place and a yielding non-metallic block $j$ is provided in a recess $h^6$ in the lower block $h^4$ to afford an anti-rattle connection and additionally serve as an automatic adjusting device for the wear of the joint.

A suitable lubricating fitting $k$ is provided, lubricant injected therethrough coming directly in contact with the bearing surface of the ball. Suitable seals $k'$ are provided to prevent any leakage of the grease to the block $j$.

The above construction affords a ball connection for the housing in which the elements are mounted in a crosswise direction, thus preventing shocks transmitted through the drag link from tending to open the ball socket.

The foregoing construction affords a unitary connection which may be highly standardized and which is of simple construction to facilitate the manufacture and assembly thereof. While the invention has been described with specific reference to the accompanying drawing, it is not to be limited, save as defined in the appended claims.

I claim as my invention:

In a lubricated ball and socket joint construction wherein the ball is held in position between movable seats, means for holding said seats in contact with said ball comprising a mass of rubber held in compression between one of the seats and the joint housing and having an annular sealing means to prevent lubricant from reaching the mass of rubber.

This specification signed this 28th day of October A. D. 1929.

PHILIP E. MATTHEWS.